US011650379B2

(12) United States Patent
Higley (10) Patent No.: US 11,650,379 B2
(45) Date of Patent: May 16, 2023

(54) ANTI-BUCKLING LATCH FOR A FIBER OPTIC CONNECTOR

(71) Applicant: US Conec, Ltd, Hickory, NC (US)

(72) Inventor: Jason Higley, Hickory, NC (US)

(73) Assignee: US Conec Ltd., Hickory, NC (US)

( * ) Notice: Subject to any disclaimer, the term of this patent is extended or adjusted under 35 U.S.C. 154(b) by 29 days.

(21) Appl. No.: 17/501,728

(22) Filed: Oct. 14, 2021

(65) Prior Publication Data

US 2022/0113477 A1    Apr. 14, 2022

Related U.S. Application Data

(60) Provisional application No. 63/091,451, filed on Oct. 14, 2020.

(51) Int. Cl.
*G02B 6/38* (2006.01)

(52) U.S. Cl.
CPC ......... *G02B 6/3893* (2013.01); *G02B 6/3879* (2013.01)

(58) Field of Classification Search
CPC ............... G02B 6/3893; G02B 6/3879; G02B 6/38875; G02B 6/3888; G02B 6/3878
See application file for complete search history.

(56) References Cited

U.S. PATENT DOCUMENTS

| | | | | |
|---|---|---|---|---|
| 6,520,796 B1* | 2/2003 | Reichle | ................ | H01R 13/465 439/491 |
| 7,147,519 B2* | 12/2006 | Reichle | ................ | H01R 13/66 439/676 |
| 9,256,033 B2* | 2/2016 | Nielson | ................ | G02B 6/3871 |
| 9,835,808 B2* | 12/2017 | Nielson | ................ | G02B 6/3871 |
| 10,409,007 B2 | 9/2019 | Kadar-Kallen et al. | | |
| 2005/0118880 A1* | 6/2005 | Reichle | ................ | G02B 6/3825 439/676 |
| 2012/0027362 A1* | 2/2012 | Yi | ................ | G02B 6/4261 29/525.01 |
| 2014/0205241 A1* | 7/2014 | Nielson | ................ | G02B 6/3871 385/66 |
| 2016/0139345 A1* | 5/2016 | Nielson | ................ | G02B 6/3825 385/60 |
| 2020/0319412 A1 | 10/2020 | Kadar-Kallen et al. | | |
| 2022/0113477 A1* | 4/2022 | Higley | ................ | G02B 6/3879 |

FOREIGN PATENT DOCUMENTS

| | | |
|---|---|---|
| WO | 2019126337 A1 | 6/2019 |
| WO | 2019195652 A1 | 10/2019 |
| WO | 2021217050 A1 | 10/2021 |

* cited by examiner

*Primary Examiner* — Andrew Jordan
(74) *Attorney, Agent, or Firm* — Michael L Leetzow PLLC; Shubhrangshu Sengupta (57) ABSTRACT

A fiber optic connector includes a housing and push-pull boot with a latch body disposed between a front extension of the push-pull boot and a top side of the housing. The latch body has an anti-buckle feature, which may be a projection. The anti-buckle feature movable between a relaxed position and a stressed position, wherein the anti-buckle feature is in contact with the housing in the stressed position to prevent the latch body from buckling.

19 Claims, 11 Drawing Sheets

ANTI-BUCKLING LATCH FOR A FIBER OPTIC CONNECTOR

REFERENCE TO RELATED CASE

This application claims priority under 35 U.S.C. § 119 (e) to U.S. provisional application No. 63/091,451 filed on Oct. 14, 2020, the contents of which are hereby incorporated by reference in their entirety.

Certain fiber optic connectors have push-pull features that allow for coupling to adapters. One such exemplary connector is the Mini Duplex Connector (MDC) that has a push-pull boot and is disclosed in Applicant's International Patent Application Pub. No. WO 2019/195652 entitled "Flexible Push-Pull Boot and Crimp Body for Fiber Optic Connector," filed Apr. 5, 2019 ("the '652 publication"). See also International Patent Application Pub. No. WO 2019/126337.

One observation in the design of such fiber optic connectors is that a latch body attached to a front extension of the boot may buckle during pulling under certain circumstances. For example, the latch body may buckle when angular or even perpendicular downward forces are applied to the fiber optic cable attached to the fiber optic connector. These forces may be intentionally applied, for example, during proof-load testing per Telcordia standards, or may be accidentally applied due to snagging of the optical fiber cable. As a result of this undesired buckling, the connector may erroneously delatch from the adapter or the receptacle in which the connector resides for mating.

Accordingly, what is needed is an improvement in the latch body that addresses the above-noted observation and rigorously meets the requirements for standard testing procedures.

SUMMARY OF THE INVENTION

According to one aspect, the present invention is directed to a fiber-optic connector that includes a housing having an opening extending between a front end and a rear end with an optical fiber support structure disposed within at least a portion of the opening, the optical fiber support structure to support at least two optical fibers disposed therein, a crimp body attached to the rear end of the housing, a push-pull boot attached to the crimp body, a front extension attached to the push-pull boot, to the crimp body and the housing, and a latch body disposed between the front extension and a top side of the housing, the latch body having an anti-buckle feature disposed thereon and extending beyond a bottom surface thereof, the anti-buckle feature movable between a relaxed position and a stressed position, wherein the anti-buckle feature is in contact with the housing in the stressed position of the latch body.

In some embodiments, in the stressed position, the anti-buckle feature is in contact with a top side of the housing, and in the relaxed position, the anti-buckle feature is separated from the housing.

In some embodiments, the anti-buckle feature is positioned at an angled middle portion of the latch body.

In some embodiments, the anti-buckle feature is positioned at an angled middle portion of the latch body longitudinally between a projection and a flange of the latch body.

In some embodiments, the anti-buckle feature is a projection.

In yet another aspect, there is a fiber-optic connector that includes a housing assembly having an opening extending between a front end and a rear end with an optical fiber support structure disposed within at least a portion of the opening, the optical fiber support structure to support at least two optical fibers disposed in the fiber-optic connector, a push-pull boot attached to the housing assembly, a front extension attached to the push-pull boot and to the housing assembly, and a latch body disposed between the front extension and a top side of the housing, the latch body having a front portion engaged to the front extension; and an anti-buckle feature disposed between the latch body and the housing assembly, wherein the anti-buckle feature is configured to block the latch body rearward of the front portion from contacting the housing assembly when the fiber-optic connector is pulled.

In some embodiments, the anti-buckle feature is configured to block the latch body rearward of the front portion from contacting the housing when the latch body is in a stressed position.

In some embodiments, the anti-buckle feature is attached to a bottom surface of the latch body rearward of the front portion.

In some embodiments, the anti-buckle feature is attached to the top side of the housing rearward of the front portion of the latch body.

In yet another aspect, there is a latch body for use with a fiber optic connector having a housing with a top housing surface and a bottom housing surface that includes a main body having a front portion, a middle portion and a rear portion, a latch extending outward from the middle portion, a rail portion extending along side portions of the main body at least partially along the front portion to slidably engage the fiber optic connector housing on one of the top housing surface and a bottom housing surface, an anti-buckle feature extending beyond a bottom surface of the main body toward the housing is provided, the anti-buckle feature movable with the latch body between a relaxed position and a stressed position, wherein the anti-buckle feature is in contact with one of the top housing surface and a bottom housing surface in the stressed position of the latch body.

It is to be understood that both the foregoing general description and the following detailed description of the present embodiments of the invention are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

DETAILED DESCRIPTION OF THE INVENTION

Reference will now be made in detail to the present preferred embodiment(s) of the invention, examples of which are illustrated in the accompanying drawings. Whenever possible, the same reference numerals will be used throughout the drawings to refer to the same or like parts.

Illustrated in FIGS. 1-4 is one embodiment of a fiber optic connector 100 according to the present invention. The fiber optic connector 100 preferably includes a housing assembly 102, an integrated push-pull polarity boot 104, and optical fiber support structures 106. The housing assembly 102 preferably has a housing 108 and a crimp body 110 that are removable from one another. As an alternative embodiment, the housing assembly 102 may also be a single unit where the housing portion 108 and the crimp body portion 110 are integral, either through adhesion (gluing, welding, etc.) or because they were molded at the same time. The optical fibers (not shown) are inserted from the rear of the fiber optic connector and may be in a cable or other protective structure 112. There may also be other elements that are included with the fiber optic connector 100, such as springs to bias the optical fiber support structures 106, a crimp band, lead-in tubes, etc. It is also possible that the illustrated structures take other forms and configurations. One example would be the optical fiber support structures 106. The optical fiber support structures 106 are illustrated as two single fiber optic ferrules that are at least partially surrounded by the housing assembly 102 and have the optical fibers secured therein. However, the fiber optic connector 100 may also have more optical fibers that are supported using other types of optical support structures 106. For example, they could be replaced using a miniature MT ferrule, such as the one described in Applicant's Patent Application no. PCT/US21/28919, entitled "Miniature Multi-fiber Ferrule," filed Apr. 23, 2021. The optical support structures 106 may have a flat end face or an angled end face for physical contact with another mating optical support structure. Alternatively, there may be lenses at the ends of the optical support structures 106 that still mate the fiber optic connector 100 with another fiber optic connector without any physical contact. For example, a lensed clear ferrule may be provided to support the optical fibers.

The integrated push-pull polarity boot 104, as illustrated, has a rear portion 104a that provides a grasping structure, as well as strain relieves the optical fibers. The integrated push-pull polarity boot 104 also has a main body 104b that is attached to the rear portion 104a and also to the crimp body 110 (or in the alternative embodiment, to the housing assembly 102). However, the main body 104b of the integrated push-pull polarity boot 104 may also be attached to the housing 108 and not directly to the crimp body 110.

Extending in a forward direction from the main body 104b and over the housing assembly 102 is front extension 104c. The front extension 104c also provides a keying function or identifies the polarity of the fiber optic connector 100. As will be recognized by one of skill in the art, the presence of the front extension 104c of the integrated push-pull polarity boot 104 prevents the fiber optic connector 100 from being inserted into an adapter or other connection device (not shown) in the wrong polarity (receive to receive, for example).

Applicant notes that the term "front" or "forward" means that direction where the fiber optic connector 100 would meet with another fiber optic connector or device, while the term "rear" or "rearward" is used to mean the direction from which the optical fibers enter into the fiber-optic ferrule or the fiber optic connector 100. In the present application, the fiber optic connector 100 will therefore have a front and a rear, the front will be inserted into an adapter or other receptacle. Thus, in FIG. 1, the "front" of the fiber optic connector 100 is on the left side of the figure and pointing out of the figure. The "rear" or "back" is that part of the fiber optic connector 100 is on the right side of the page and "rearward" and "backward" is toward the right and into the page.

The housing assembly 102 (and indeed the fiber optic connector 100 and its other components) may also have what is labeled a top side 102a and a bottom side 102b, but those labels are to assist in the explanation of the invention and are a convention only. It should also be noted that the top side 102a bottom side 102b are generally the shorter sides 102c of the fiber optic connector 100 and the housing assembly 102. That is, the housing 108 may be flipped so that the labeled top side 102a is on the opposite side of the front extension 104c of the integrated push-pull polarity boot 104.

The housing assembly 102 has an opening 114 extending between a front end 116 and a rear end 118 with the optical fiber support structure 106 disposed within at least a portion of the opening 114. See, e.g., FIGS. 4 and 9. The optical fiber support structures 106 should support at least two optical fibers disposed in the fiber-optic connector 100. The crimp body 110 would also have an opening 122 that is in communication with the opening 114 to allow for the optical fibers to pass therethrough. See FIG. 4. The crimp body 110 extends between a front end 124 and a rear end 126 thereof.

The fiber optic connector 100 also includes a latch body 130 that is disposed between the housing assembly 102 and the front extension 104c of the integrated push-pull polarity boot 104. The latch body 130 has an angled latch 132 that engages the adapter or other receptacle into which the fiber optic connector 100 is inserted. The fiber optic connector 100 can be inserted into and removed from the adapter or other receptacle by using the integrated push-pull polarity boot 104. The integrated push-pull polarity boot 104 controls the positioning of the angled latch 132 as will be explained below.

Turning to FIGS. 5-9, the latch body 130 has an elongated main body 134 that has a generally flat or level front portion 136, a middle portion 138 that is angled upward from the front portion 136 to the angled latch 132, and a generally flat rear portion 140, although there may be some downward angling thereof. The latch body 130 has a top surface 142 and a bottom surface 144. The front portion 136 has a cross bar 146 that is perpendicular to a line A connecting the front portion 136, the middle portion 138, and the rear portion 140. See FIG. 7A. Somewhat rearward of the crossbar 146, but still within the front portion 136 and extending from the bottom surface 144 is an engagement portion 148 that engages a portion of the front extension 104c of the integrated push-pull polarity boot 104. As illustrated best in FIGS. 2, 3, and 8B, the main body 134 is positioned within a slot 150 in a front portion of the front extension 104c and the engagement portion 148 includes two lobes 148a and 148b to engage a portion of the front extension 104c adjacent two rails 152 on either side of the front extension 104c. See FIG. 8A. The two rails 152 of the front extension 104c in turn engage an opening 160 on the top side 102a of the housing 108 (see, FIG. 3). The opening 160 in turn includes receptacles 162 on either side of the opening 160 to receive the rails 152 to connect the front extension 104c to the housing 108. See FIGS. 2, 8A, 8B, and 9.

It should be noted that the main body 134 could have a slot therein on the bottom surface 144 so that the lobes 148a and 148b could be separated more from each other. The cross bar 146 is not disposed within the opening 160, but extends forward of the opening 160 towards the front end 116. See FIGS. 3 and 4.

Turning back to FIG. 2, the front extension 104c has a window 164 to allow the angle latch 132 to extend upward out of the fiber optic connector 100 to engage the adapter or the receptacle into which the fiber optic connector 100 is inserted. The front extension 104c also has a space 166 to receive the rear portion 140 of the latch body 130. The rear portion may have a flexure member 168, which acts as a type of spring mechanism when the integrated push-pull polarity boot 104 is either pulled or pushed. The flexure member 168 biases the front extension 104c (and hence, the push-pull polarity boot 104) in a forward direction.

The latch body 130 also has an anti-buckle feature 170 that preferably extends from the latch body 130 below the bottom surface 144. The illustrated anti-buckle feature 170 has an arcuate shape (part of a circle) that extends from the bottom surface 144. However, the anti-buckle feature 170 could have other forms (e.g., pyramidal profile or a trapezoidal profile) and could extend from the sides of the main body 134. While only one anti-buckle feature 170 is illustrated, there could be two or more that are separated from each other across the main body 134. As noted above, one could extend from each of the sides of the main body 134 or be separated across the bottom surface 144. The anti-buckle feature 170 (in both embodiments) is disposed between the latch body 130 and the housing 108 (or the housing assembly 102). In a front to back direction, the anti-buckling feature 170 is the disposed within the middle portion 138 of the latch body 134 between the engagement portion 148 and flanges 154. The anti-buckle feature 170 is configured to block the latch body 134 rearward of the front portion 136 from contacting the housing assembly 102 when the fiber-optic connector 100 is pulled. For example, the anti-buckle feature 170 may be provided on an underside of the middle portion 138. However, in alternative embodiments, the anti-buckle feature 170 may be provided on other components of the fiber optic connector 100 (e.g., on the housing assembly 102 or the front extension 104c, as described below herein), as long as the latch body 134 is prevented from buckling under stress.

Figure 10A:
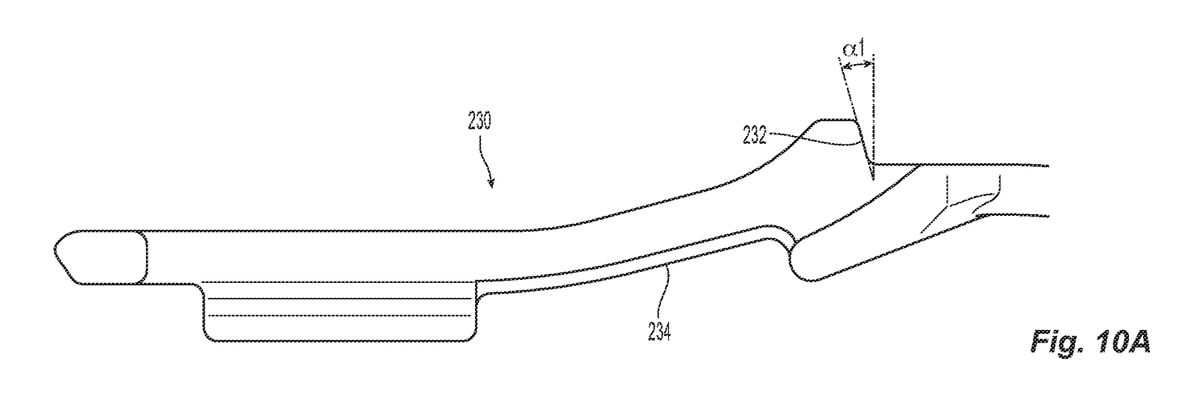
FIG. 10A is a side elevational view of a prior art latch body in a relaxed position.
Figure 10B:
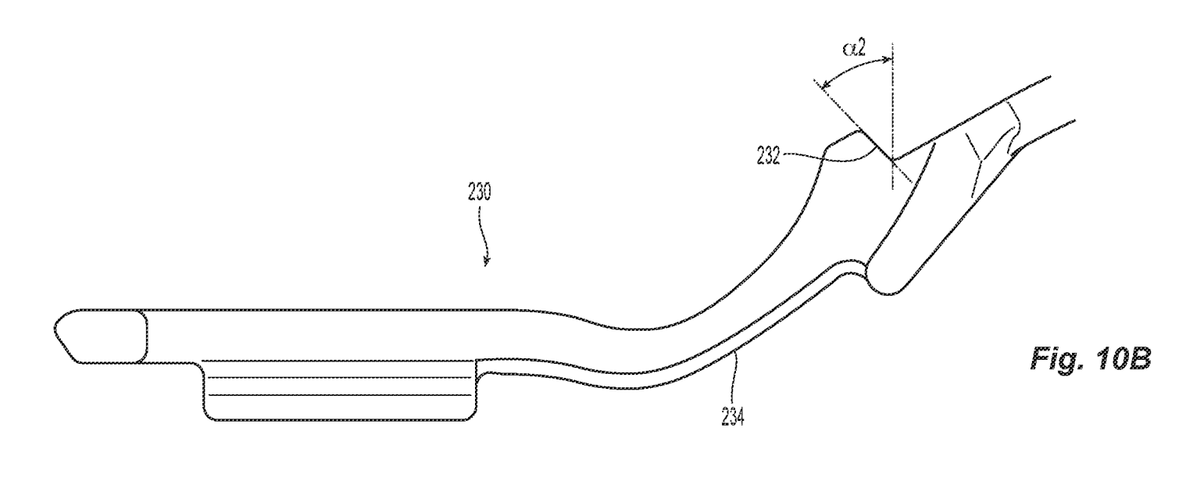
FIG. 10B is a side elevational view of a prior art latch body without an anti-buckle feature in a stressed position.

Turning to FIGS. 10A and 10B, the reason for the anti-buckle feature 170 will be described. In FIG. 10, a conventional latch body 230 without the anti-buckle feature 170 is illustrated and it is in a relaxed condition. That is, there are no forces operating on it. The latching surface 232 makes an angle α1 with a vertical axis. In FIG. 10B, there are forces being applied to the latch body 232, and the middle portion 234 of the latch body 230 is deformed by bending in the middle portion 234. The latching surface 232 now makes an angle α2 with the vertical and α2 is much greater than α1. That is, the latch body 230 buckles under stress, as indicated by the bent shape in FIG. 10B. This change in the angle of the latching surface 234 causes the fiber optic connector 100 to fall out of or to be more prone to accidental removal from the adapter or receptacle. Such accidental delatching of the fiber optic connector 100 may cause increase in optical losses, or even failure of the optical connection that the fiber optic connector 100 implements.

Figure 1:
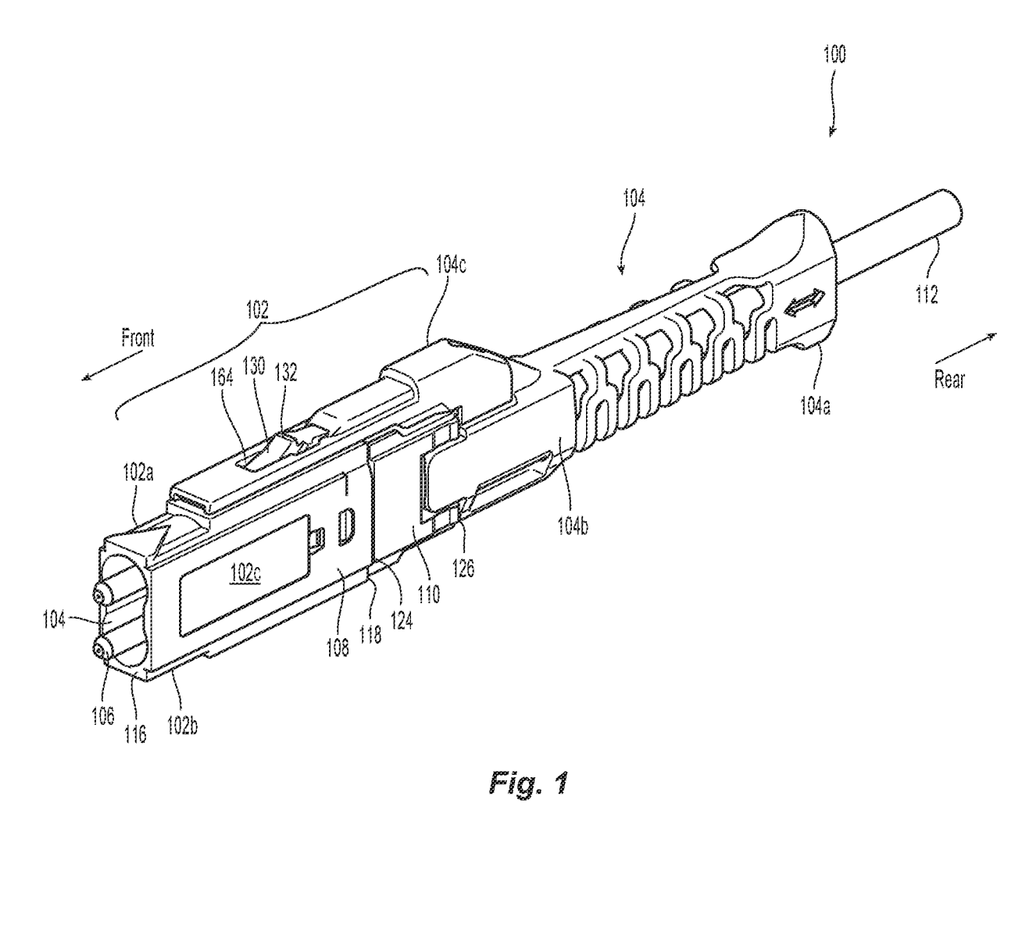
FIG. 1 is a perspective view of one embodiment of a fiber optic connector according to the present invention.
Figure 2:
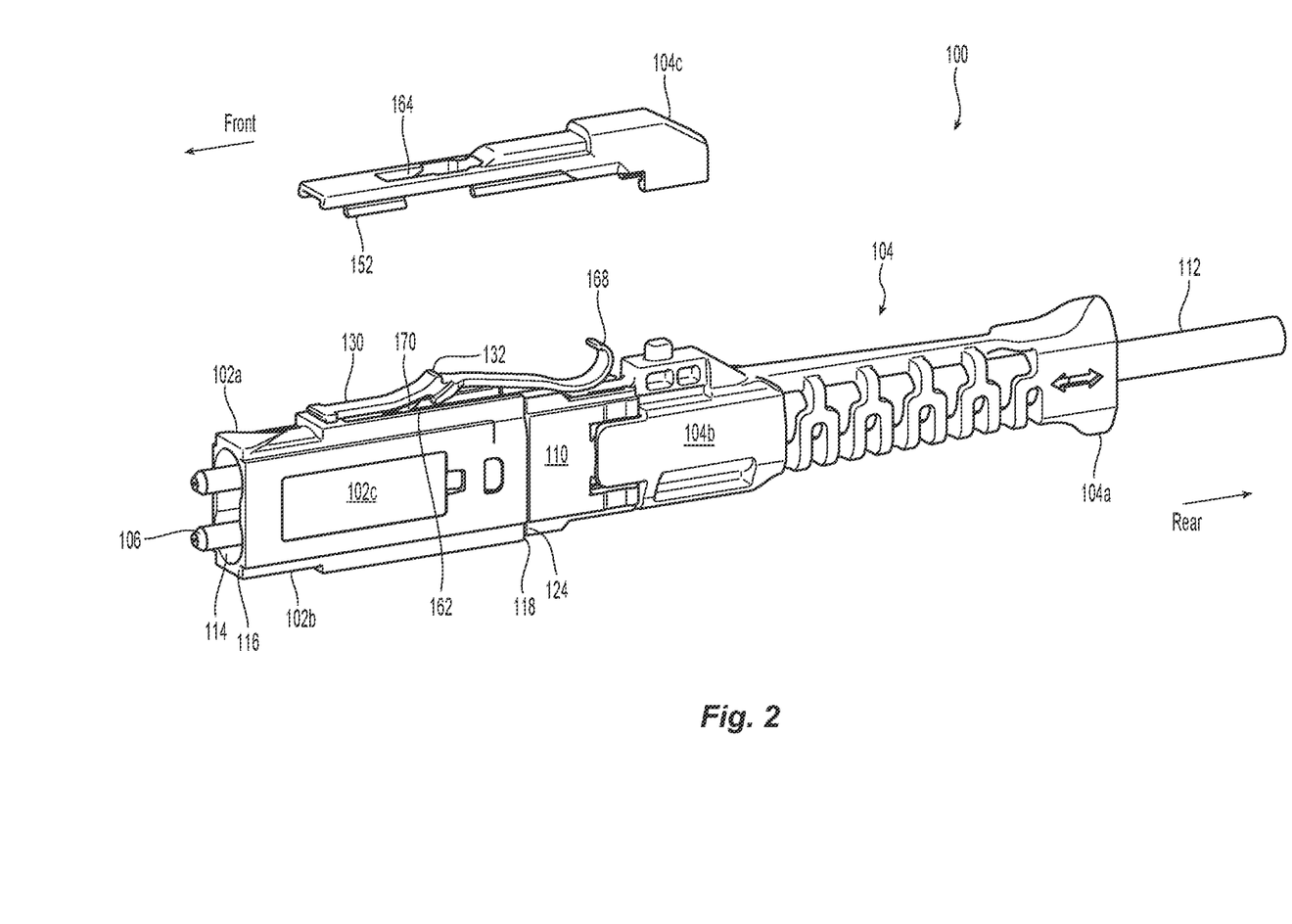
FIG. 2 is a partial exploded perspective view of the fiber optic connector in FIG. 1.
Figure 3:
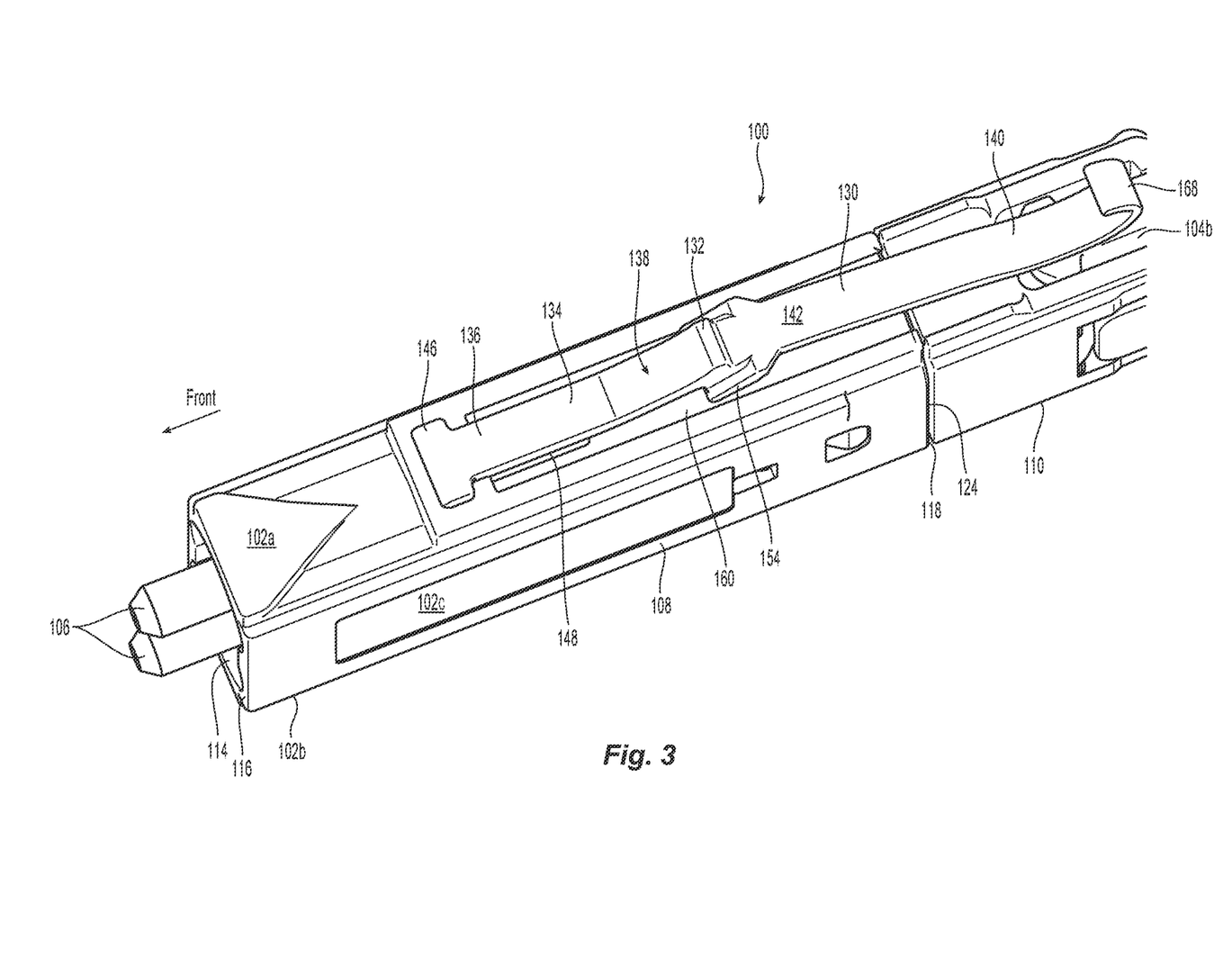
FIG. 3 is a top perspective view the fiber optic connector in FIG. 1 showing the latch body attached to the housing thereof.
Figure 4:
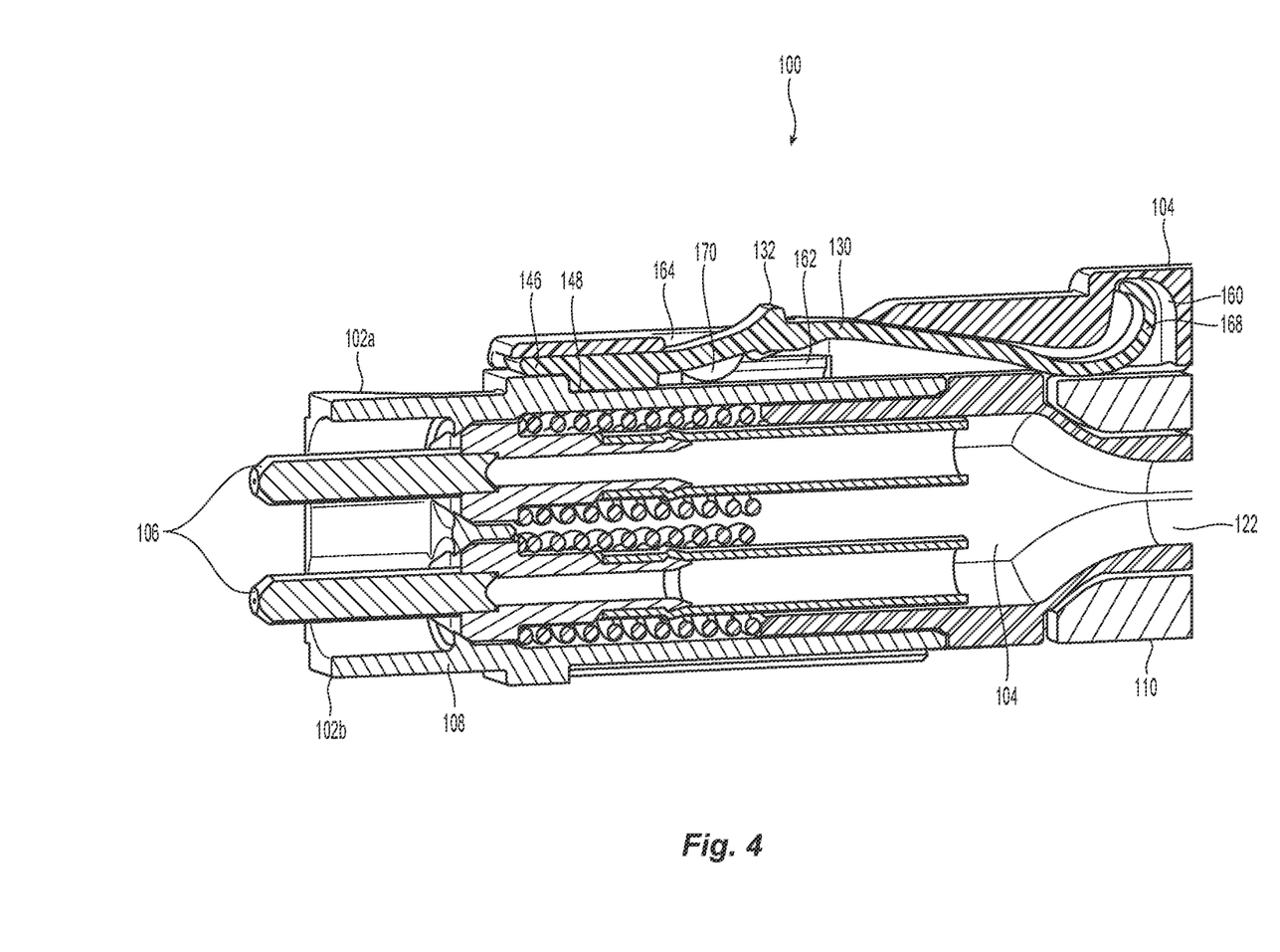
FIG. 4 is a cross section view of the fiber optic connector in FIG. 1.
Figures 5, 6:
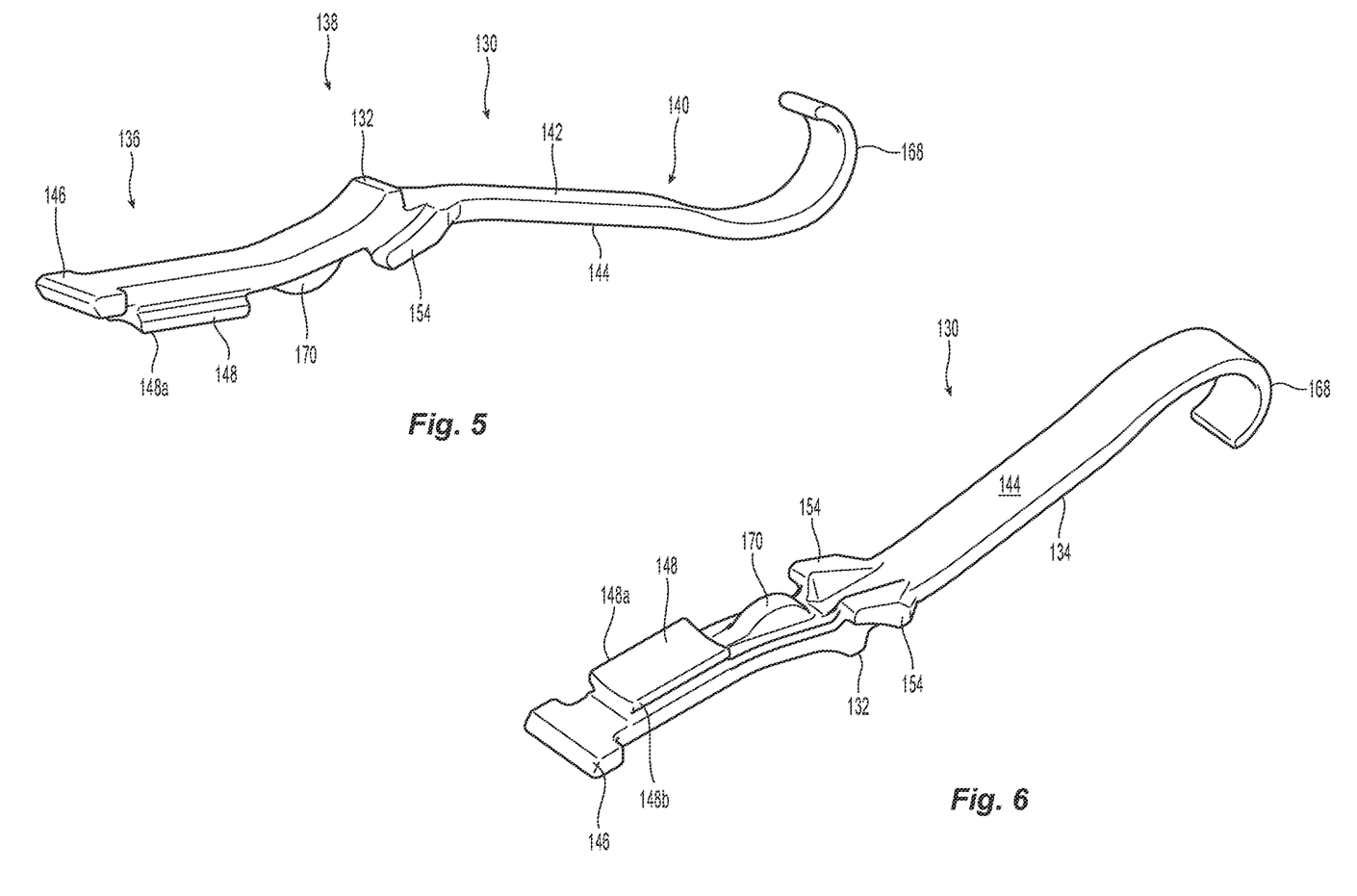
FIG. 5 is a top perspective view from the upper right of the latch body for the fiber optic connector in FIG. 1.
FIG. 6 is a bottom perspective view of the latch body in FIG. 5 from the lower right.
Figure 7A:
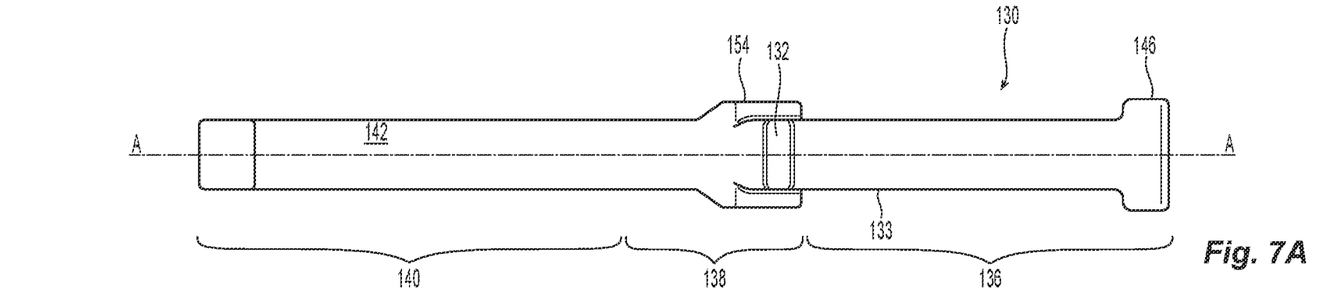
FIG. 7A is a top planar view of the latch body.
Figure 7B:
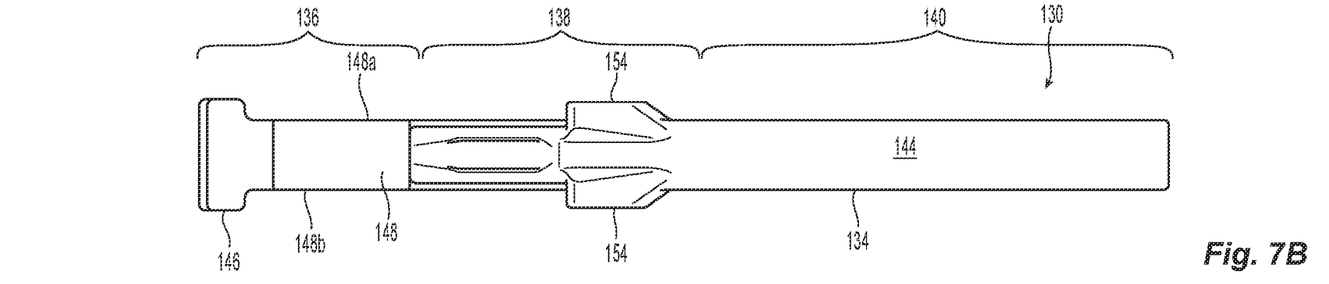
FIG. 7B is a bottom planar view of the latch body.
Figure 7C:
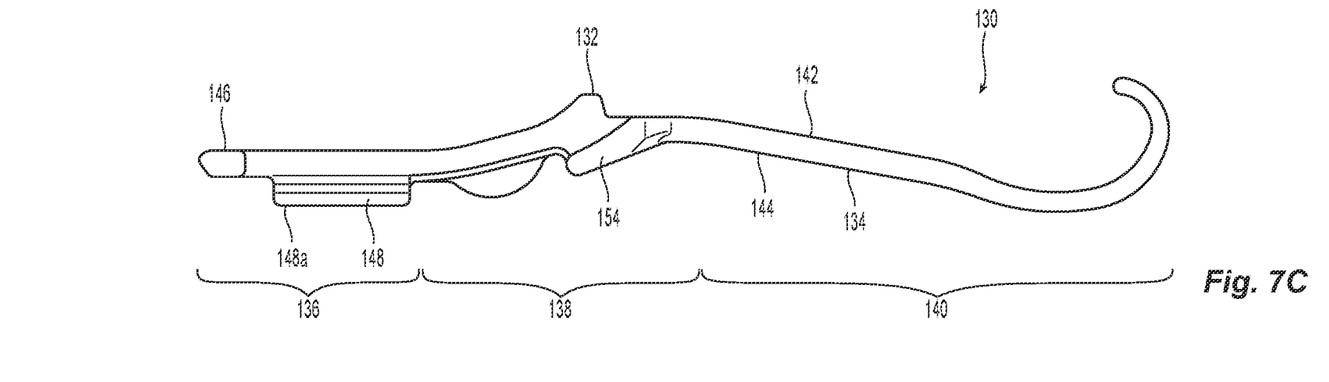
FIG. 7C is an elevational view of the left side of the latch body.
Figures 8A, 8B:
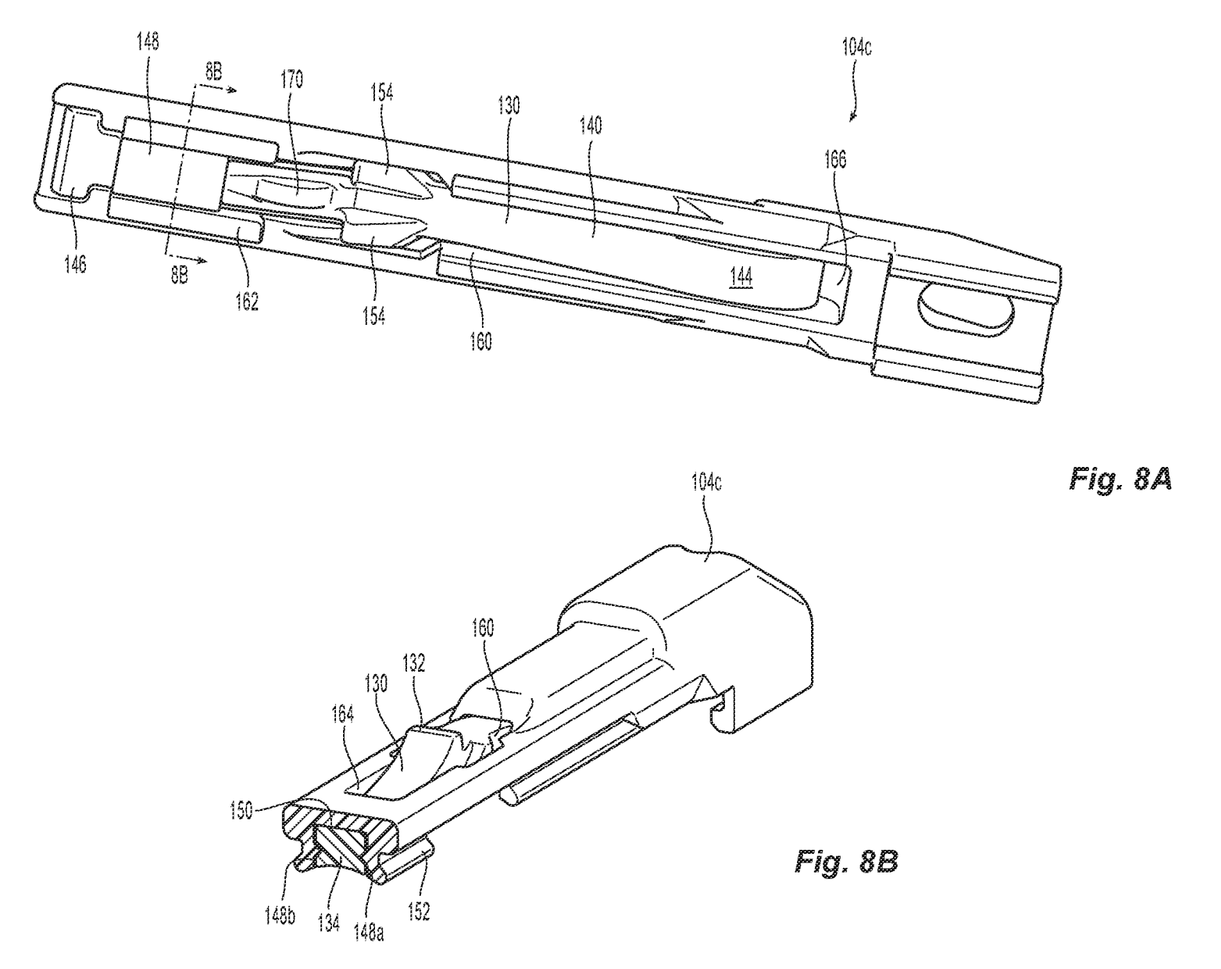
FIG. 8A is a perspective view of the latch body from the bottom showing the latch body and the front extension of the fiber optic connector.
FIG. 8B is a cross section view of the latch body and front extension along the line 8B-8B from FIG. 8A.
Figure 9:
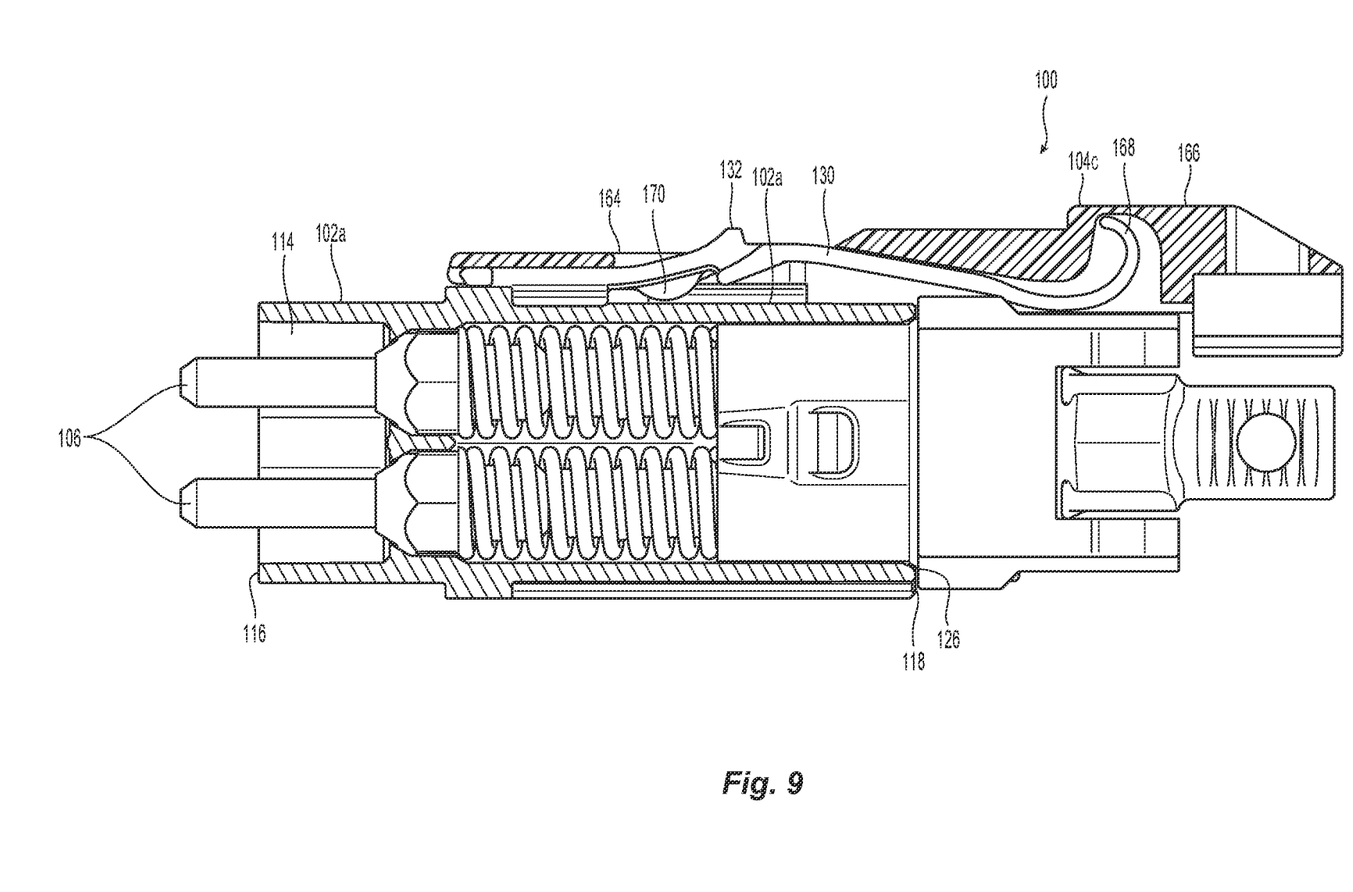
FIG. 9 is an elevational view of a cross section view of the fiber optic connector in FIG. 1 showing the forces on the latch body.

Referring to FIG. 4, the fiber optic connector 100 and the latch body 130 are in a first, relaxed position. The anti-buckle feature 170 is not engaging the top side 102a (or, is not in contact) of the housing 108. That is, there is a gap or space between the anti-buckle feature 170 and the top surface 102a of the housing 108. As shown in other embodiments of FIGS. 11, 12, the anti-buckle feature 170 may be provided elsewhere as long as the middle portion 138 of the latch body 130, or elsewhere behind the front portion 136 of the latch body 130. In FIG. 9, when there is a force applied to the latch body 130, the middle portion 138 may bend slightly, until the anti-buckle feature 170 engages the top side 102a of the housing 108. This position is a second, stressed position. The anti-buckle feature 170 prevents the latch body 130 from buckling as illustrated in FIG. 10B. If the latch body 130 does not bend in this stressed position, then the latch surface (e.g., of the middle portion 138) will not buckle, distort in shape, or bend, or rotate, and subsequently disengage the latch body 130 from the adapter or other receptacle.

Figure 11:
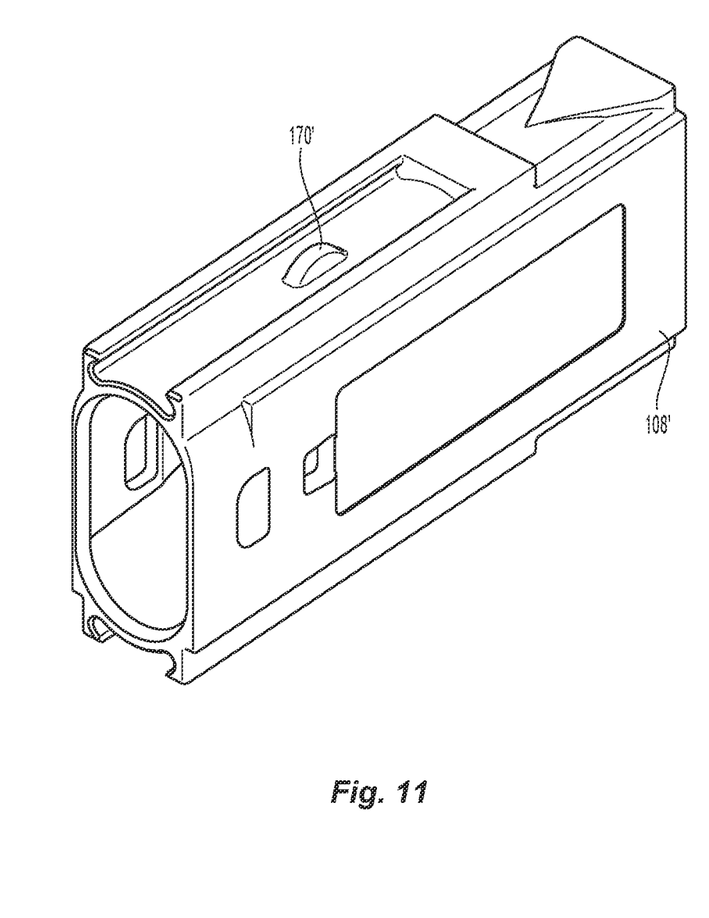
FIG. 11 is a perspective view of another embodiment of a housing to use with a fiber optic connector according to the present invention with the anti-buckling feature on the housing or a housing assembly.
Figure 12:
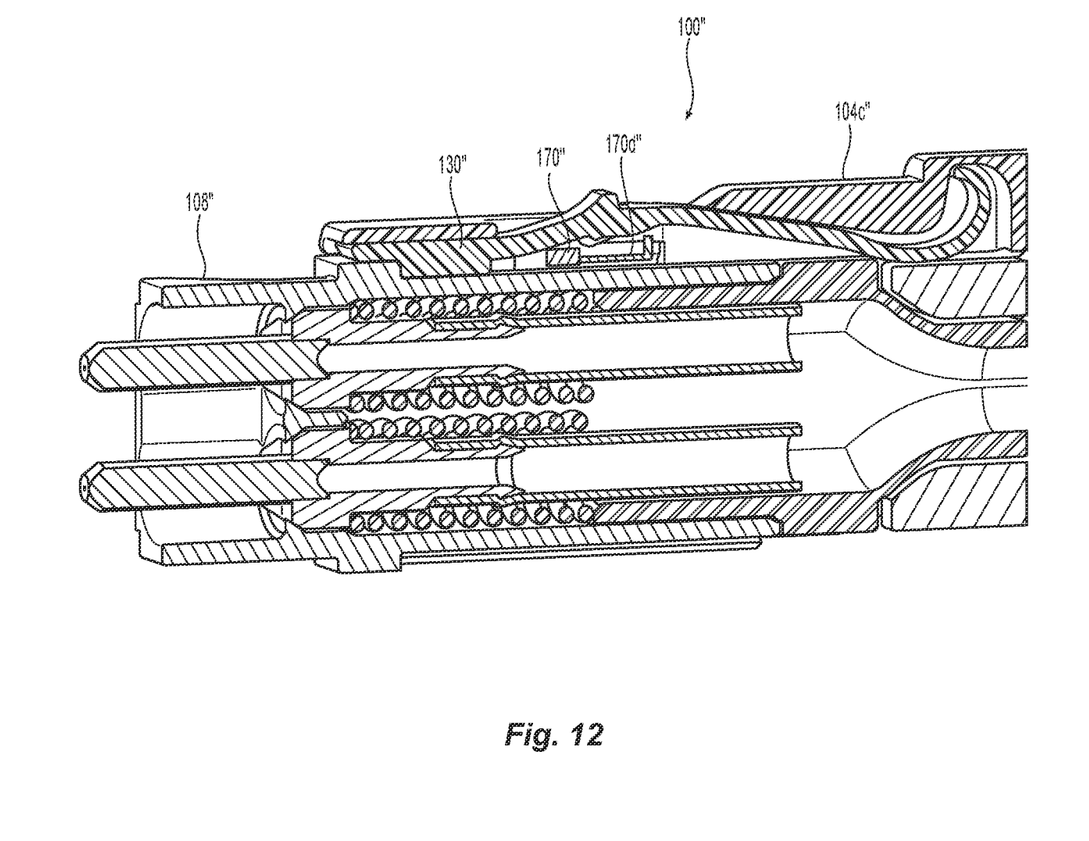
FIG. 12 is a cross sectional view of another embodiment of a housing to use with a fiber optic connector according to the present invention with the anti-buckling feature attached to the front extension.

As illustrated in FIG. 11, the anti-buckle feature 170' could be on the housing 108' instead. And as illustrated in FIG. 12, the anti-buckle feature 170" for fiber optic connector 100" need not be attached to the housing 108" or the latch body 130". Rather it can be attached to the front extension 104c" by way of a support structure 104d" that extends the anti-buckle feature 170" to a position between the latch body 130" and the housing 108". While the anti-buckle feature 170" is illustrated as a block, it could take any appropriate form. Additionally the anti-buckle feature 170" could also be attached to the front extension 104c" in any appropriate way or location.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:
1. A fiber-optic connector, comprising:
a housing having an opening extending between a front end and a rear end with an optical fiber support structure disposed within at least a portion of the opening, the optical fiber support structure to support at least two optical fibers disposed therein;

a crimp body attached to the rear end of the housing;
a push-pull boot attached to the crimp body;
a front extension attached to the push-pull boot, the crimp body and the housing; and
a latch body disposed between the front extension and a top side of the housing, the latch body having an anti-buckle feature disposed thereon and extending beyond a bottom surface thereof, the anti-buckle feature movable between a relaxed position and a stressed position, wherein the anti-buckle feature is in contact with the housing in the stressed position of the latch body.

2. The fiber-optic connector of claim 1, wherein the latch body comprises a flexure member at a rear end thereof.

3. The fiber-optic connector of claim 1, wherein in the stressed position, the anti-buckle feature is in contact with the top side of the housing, and in the relaxed position, the anti-buckle feature is separated from the housing.

4. The fiber-optic connector of claim 1, wherein the anti-buckle feature is positioned at an angled middle portion of the latch body.

5. The fiber-optic connector of claim 1, wherein the anti-buckle feature is positioned at an angled middle portion of the latch body longitudinally between an engagement portion and a flange of the latch body.

6. The fiber-optic connector of claim 5, wherein the engagement portion includes at least one lobe to engage the front extension.

7. The fiber-optic connector of claim 1, wherein the latch body further comprises an angled latch on a top surface thereof, the angled latch configured to be positioned within a window of the front extension.

8. The fiber optic connector of claim 1, wherein the anti-buckle feature is a projection.

9. A fiber-optic connector, comprising:
a housing assembly having an opening extending between a front end and a rear end with an optical fiber support structure disposed within at least a portion of the opening, the optical fiber support structure to support at least two optical fibers disposed in the fiber-optic connector;
a push-pull boot attached to the housing assembly;
a front extension attached to the push-pull boot and to the housing assembly; and
a latch body disposed between the front extension and a top side of the housing assembly, the latch body having a front portion engaged to the front extension; and
an anti-buckle feature disposed between the latch body and the housing assembly,
wherein the anti-buckle feature is configured to block the latch body from contacting the housing assembly when the fiber-optic connector is pulled.

10. The fiber-optic connector of claim 9, wherein the anti-buckle feature is configured to block the latch body rearward of the front portion from contacting the housing assembly when the latch body is in a stressed position.

11. The fiber-optic connector of claim 9, wherein the anti-buckle feature is attached to a bottom surface of the latch body rearward of the front portion.

12. The fiber-optic connector of claim 11, wherein the anti-buckle feature does not contact the housing assembly when the latch body is in a relaxed state.

13. The fiber-optic connector of claim 9, wherein the anti-buckle feature is attached to the top side of the housing assembly rearward of the front portion of the latch body.

14. A latch body for use with a fiber optic connector having a housing with a top housing surface and a bottom housing surface comprising:
a main body having a front portion, a middle portion and a rear portion;
a latch extending outward from the middle portion;
a rail portion extending along side portions of the main body at least partially along the front portion; and
an anti-buckle feature extending beyond a bottom surface of the main body toward the housing of the fiber optic connector, the anti-buckle feature movable with the latch body between a relaxed position and a stressed position, wherein the anti-buckle feature is in contact with one of the top housing surface and the bottom housing surface in the stressed position of the latch body.

15. The latch body according to claim 14, wherein the rear portion is a flexure member.

16. The latch body according to claim 14, wherein in the stressed position, the anti-buckle feature is in contact with a top side of the housing, and in the relaxed position, the anti-buckle feature is separated from the housing.

17. The latch body according to claim 14, wherein the anti-buckle feature is positioned at the middle portion of the latch body, the middle portion being angled relative to the front portion.

18. The latch body according to claim 14, wherein the anti-buckle feature is positioned at the middle portion of the latch body longitudinally between the rail portion and a flange of the latch body.

19. The latch body according to claim 14, wherein the anti-buckle feature is a projection.

\* \* \* \* \*